US011872504B2

(12) United States Patent
Yagoobi et al.

(10) Patent No.: US 11,872,504 B2
(45) Date of Patent: Jan. 16, 2024

(54) ATOMIZING DEVICE FOR USE IN A SPRAY DRYER

(71) Applicant: Worcester Polytechnic Institute, Worcester, MA (US)

(72) Inventors: Jamal S. Yagoobi, Hopkinton, MA (US); Mengqiao Yang, Worcester, MA (US); Mehrnoush F. Dardashti, Worcester, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 0 days.

(21) Appl. No.: 17/853,152

(22) Filed: Jun. 29, 2022

(65) Prior Publication Data

US 2023/0001321 A1 Jan. 5, 2023

Related U.S. Application Data

(60) Provisional application No. 63/216,715, filed on Jun. 30, 2021.

(51) Int. Cl.

| | |
|---|---|
| ***B01D 1/18*** | (2006.01) |
| ***B05B 17/06*** | (2006.01) |
| ***B01J 2/02*** | (2006.01) |
| ***B01D 1/20*** | (2006.01) |
| ***B05B 17/00*** | (2006.01) |

(52) U.S. Cl.

CPC ................. *B01D 1/18* (2013.01); *B01D 1/20* (2013.01); *B01J 2/02* (2013.01); *B05B 17/0607* (2013.01); *B05B 17/0623* (2013.01); *B05B 17/0646* (2013.01)

(58) Field of Classification Search

CPC .... B01D 1/16; B01D 1/18; B01D 1/20; B05B 17/0607–0646

See application file for complete search history.

(56) References Cited

U.S. PATENT DOCUMENTS

| | | | | |
|---|---|---|---|---|
| 3,173,612 A * | 3/1965 | Boucher | F02M 69/041 | 239/4 |
| 3,346,189 A * | 10/1967 | Eisenkraft | B05B 17/0607 | 239/4 |

(Continued)

OTHER PUBLICATIONS

International Search Report, PCT/IB2022/056082, dated Oct. 13, 2022, pp. 1-4.

(Continued)

*Primary Examiner* — Jonathan Luke Pilcher

(74) *Attorney, Agent, or Firm* — Armis IP Law, LLC

(57) ABSTRACT

An atomizing spray dryer employs one or more stages defined by ultrasonic transducers in close proximity to a liquid feed opening forming a path of an atomization flow for producing uniform droplets from a close tolerance with the transducer. The atomization flow exits a gap between the transducer and an outer edge of the opening, such that the passed liquid is responsive to an oscillation of the transducer for forming the droplets. A conical or other suitably shaped transducer engages a substantially round liquid feed opening. Subsequent stages may include a circular, ring, or other suitable shape aligned to receive the atomization flow from a circumference of the conical base, or may also take any suitable shape, preferably to receive droplets directed by the first stage.

14 Claims, 9 Drawing Sheets

(56) References Cited

U.S. PATENT DOCUMENTS

| | | | | | |
|---|---|---|---|---|---|
| 4,402,458 | A * | 9/1983 | Lierke | B06B 3/00 310/330 |
| 4,473,187 | A * | 9/1984 | Lierke | B06B 3/00 239/102.2 |
| 4,799,622 | A * | 1/1989 | Ishikawa | F23D 11/345 239/294 |
| 4,991,774 | A * | 2/1991 | Kelly | B05B 5/025 239/3 |
| 5,553,394 | A * | 9/1996 | Cosley | H01L 23/4735 239/524 |
| 6,383,555 | B1 | 5/2002 | Hayashi et al. | |
| 10,006,704 | B2 | 6/2018 | Plavnik | |
| 10,488,108 | B2 | 11/2019 | Plavnik et al. | |
| 10,755,104 | B2 | 8/2020 | Li et al. | |
| 11,353,263 | B2 | 6/2022 | Plavnik | |
| 2007/0152361 | A1* | 7/2007 | Hansen | B01D 1/18 425/130 |
| 2019/0054492 | A1* | 2/2019 | Gao | B05B 7/12 |
| 2020/0122184 | A1* | 4/2020 | Gao | B05B 7/066 |

OTHER PUBLICATIONS

Lee, S. H. et al., "Nano spray drying : A novel method for preparing protein nanoparticles for protein therapy", International Journal of Pharmaceutics, 2011, vol. 403, pp. 192-200.

Sosnik, A. et al., "Advantages and challenges of the spray-drying technology for the production of pure drug particles and drug-loaded polymeric carriers", Advances in Colloid and Interface Science, 2015, vol. 223, pp. 40-54.

Khaire, R. A. et al., "Novel approaches based on ultrasound for spray drying of food and bioactive compouds", Drying Technology an international Journal, 2020, vol. 39, pp. 1832-1853.

* cited by examiner

ATOMIZING DEVICE FOR USE IN A SPRAY DRYER

RELATED APPLICATIONS

This patent application claims the benefit under 35 U.S.C. § 119(e) of U.S. Provisional Patent App. No. 63/216,715, filed Jun. 30, 2021, entitled "ATOMIZING SPRAY DRYER," incorporated herein by reference in entirety.

STATEMENT REGARDING FEDERALLY SPONSORED RESEARCH AND DEVELOPMENT

This invention was made with government support under Grant Nos. IUCRC 10109 and 10507, awarded by the National Science Foundation (NSF). The government has certain rights in the invention.

BACKGROUND

Spray drying is a method of producing a dry powder from a liquid or slurry by rapidly drying with a hot gas. This is a preferred method of drying of many thermally-sensitive materials such as foods and pharmaceuticals. Corresponding industry sectors (including food, pharma, chemicals, and painting) are in need of more energy efficient spray dryers to accommodate different products with reduced waste. This will benefit from an atomizer that is capable of handling liquids with a wide range of viscosity and a higher flowrate.

SUMMARY

An atomizing spray dryer employs one or more stages defined by ultrasonic transducers in close proximity to a liquid feed opening forming a path of an atomization flow for producing uniform droplets from a close tolerance with the transducer. The atomization flow exits a gap between the transducer and an outer edge of the opening, such that the passed liquid is responsive to an oscillation of the transducer for forming the droplets. A conical or other suitably shaped transducer engages a substantially round liquid feed opening. Subsequent stages may include a circular, ring, or other suitable shape aligned to receive the atomization flow from a circumference of the conical base, or may also take any suitable shape, preferably to receive droplets directed by the first stage.

Configurations herein are based, in part, on the observation that spray drying is convenient for generating a powder form of various substances for industrial, manufacturing and food preparation environments. Unfortunately, conventional approaches to spray drying suffer from the shortcoming of low flow rates and volume and an ability to generate a consistent particle size, particularly for viscous substances. Accordingly, configurations herein present a multi-stage transducer based spray drying approach for a serial atomization treatment of a liquid stream using a shaped nozzle and transducer surface for directing the atomized fluid stream through multiple stages. Transducer oscillation is controlled based on a desired atomized particle size and flow rate, and generates a high volume of consistent particle output.

Ultrasonic atomization is based on the response of the liquid-air interface to incident oscillations by a transducer, which break the bulk liquid into fine droplets. A transducer is the device which could convert one form of energy into another. Piezoelectricity, the fundamental theory behind ultrasonics, describes the phenomenon the electric charge generation proportion to the applied mechanical stress and vice versa. One conventional application is a commercially available ultrasonic humidifiers. Vibrating plate transducers (usually in disc shape) are commonly used due to its superior performance. With this type of transducer immersed into a reservoir of water at a certain depth under the water surface, the alternative current (AC) signal is converted to mechanical vibration towards the water-air interface by creating a mist of water. This conventional example does not exhibit performance consistent with high volume or viscous materials, as often required in industrial applications.

The disclosed spray drying atomizer is based on the ultrasound mechanism applied to the flow generated by nozzles such as a radial jet reattachment (RJR) and slot jet reattachment (SJR) nozzles. Specifically, the ultrasonic vibration is applied to the liquid feed at the nozzle exit by installing the transducer either on the bottom plate of the nozzle, or alternatively the bottom plate of the nozzle will be the ultrasound transducer itself. Either way, the bottom plate, shaped at any desired exit angle of the RJR or SJR nozzle, will be the source of ultrasound vibration generating uniform droplets at a desired diameter. The nozzle exit opening size and its exit angle will influence the droplet size. It is important to recognize that the unique structure of RJR and SJR nozzles will allow for a higher throughput of liquid feed which is very desirable.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Spray dryers generally use some type of atomizer or spray nozzle to disperse a liquid or slurry into a controlled drop size spray. The most common of these are rotary disk and single-fluid high pressure swirl nozzles. Atomizer wheels are known to provide broader particle size distribution, but both methods allow for consistent distribution of particle size. Alternatively, for some applications, two-fluid or ultrasonic nozzles are used. Depending on the process requirements, drop sizes from 10 to 500 μm can be achieved with the appropriate choices. The most common applications are in the 100 to 200 μm diameter range. The resulting dry powder is typically free-flowing, and is transported away by the gaseous flow around the nozzles and transducers to a dry particle collector or storage.

Figure 1:
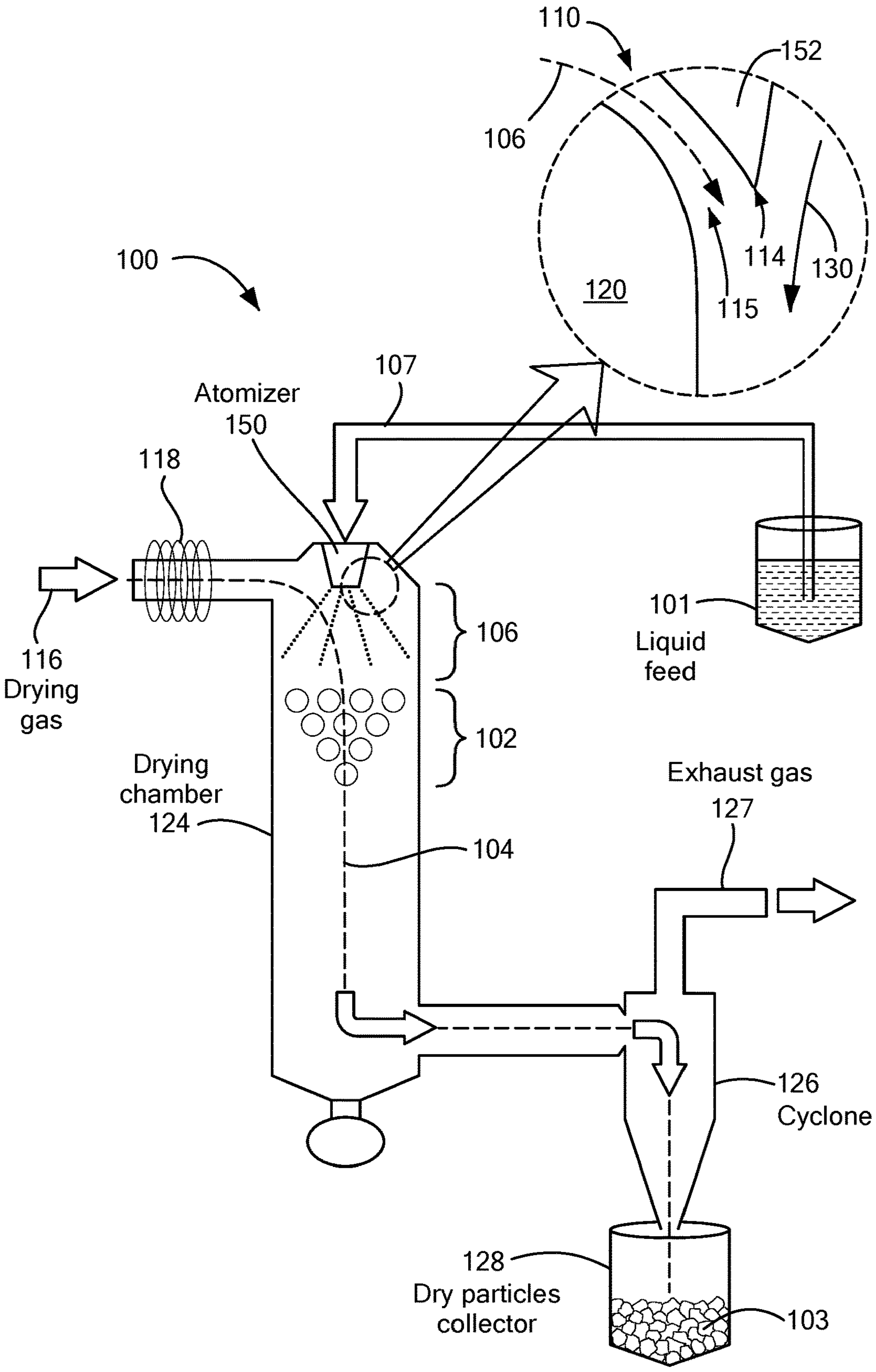
FIG. 1 is a context diagram of a spray drying apparatus suitable for use with configurations herein.

FIG. 1 is a context diagram of a spray drying apparatus suitable for use with configurations herein. Referring to FIG. 1, an atomizing spray dryer 100 performs spray drying of a liquid 101 for forming a dry powder 103 collected in a particulate form. A drying gas 116, heated from inline heating elements 118, passes through or along an atomizer 150 for dispersing and agitating the liquid 101 into droplets 102. Once dried into a particulate form in a drying chamber 124, a cyclone 126 separates the drying gas 116 as an exhaust gas flow 127 and allows the particles resulting from the now dried droplets 102 to accumulate as a dry powder in a collector 128 or hopper.

The atomizing spray dryer 100 employs one or more stages, each defined by ultrasonic transducers 120 in close proximity to a liquid feed opening joining a path 104 of an atomization flow for producing uniform droplets 102 from a close tolerance with the transducer 120. The atomization flow 106 exits a gap 110 between the transducer 120 and an outer edge 114 of the opening to form an exit for the liquid 101, such that the passed liquid is responsive to an oscillation of the transducer 120 for forming the droplets 102. In an example configuration, a conical or other suitably shaped transducer 120 engages a substantially round liquid feed opening. The conical or tapered shape has a profile for dispersing a drying gas for forming a uniform spray formed from the atomization flow 106. Subsequent stages may include a circular or ring shape aligned to receive the atomization flow from a circumference of the conical base, or may also take any suitable shape, preferably to receive droplets directed by the first stage.

In a configuration disclosed herein, the atomizing spray dryer 100 includes a liquid feed vessel 107 having a source of the liquid 101 and an atomization exit 115. The transducer 120 in close proximity to the atomization exit is disposed to define an opening between a liquid feed vessel 107 and the transducer. A driver circuit 156 connects to the transducer 120 and is configured for driving the transducer at an ultrasonic oscillation rates and amplitude, such that the atomization liquid 101 delivered via the liquid feed vessel 107 passes between the atomization exit 115 opening in communication with the transducer 120. Oscillation rates may be determined based on a viscosity of the liquid 101, a desired size of the droplets 102, and a speed or rate at which the liquid 101 is atomized. The drying gas 116 imposes a gaseous flow 130 adjacent to the transducer 120, such that the gaseous flow receives the atomized liquid 101 for transporting the droplets 102 for forming the atomization flow 106 of propelled particles during drying of the particles into a dry powder.

Figure 2A:
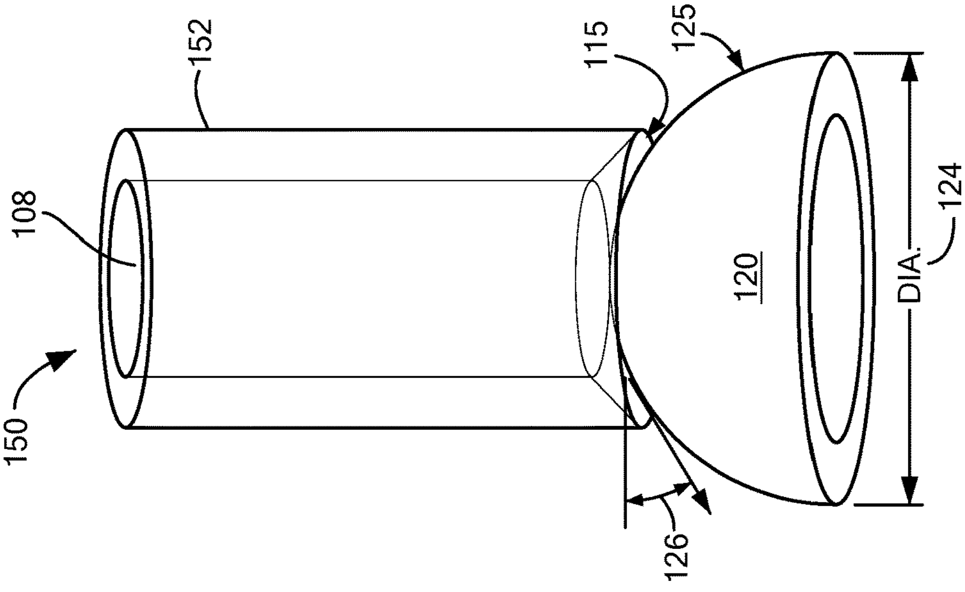
FIGS. 2A-2C show a lower perspective, side elevation and upper perspective views of an atomizer in the environment of FIG. 1.
Figure 2B:
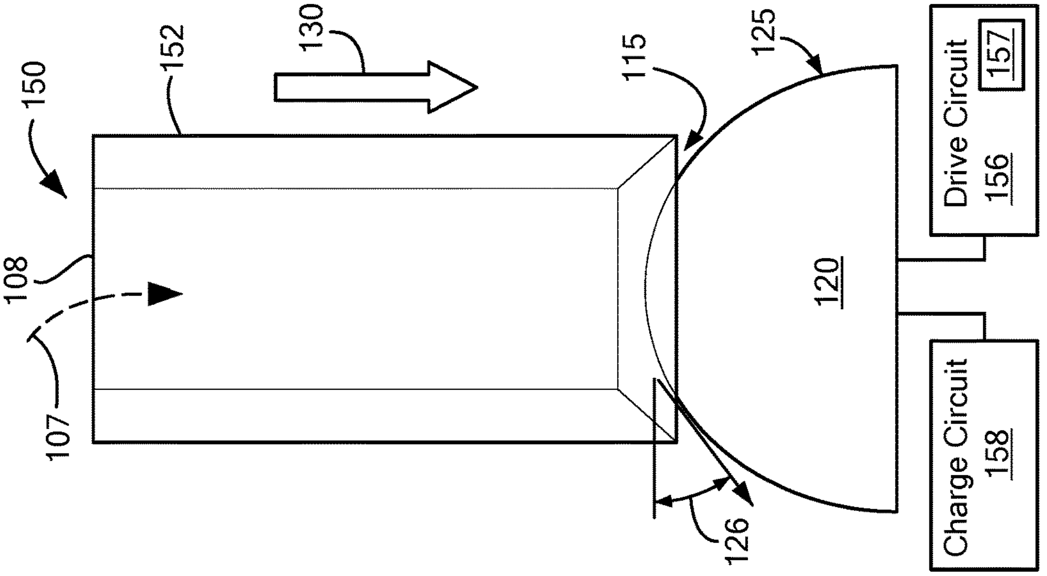
Figure 2C:
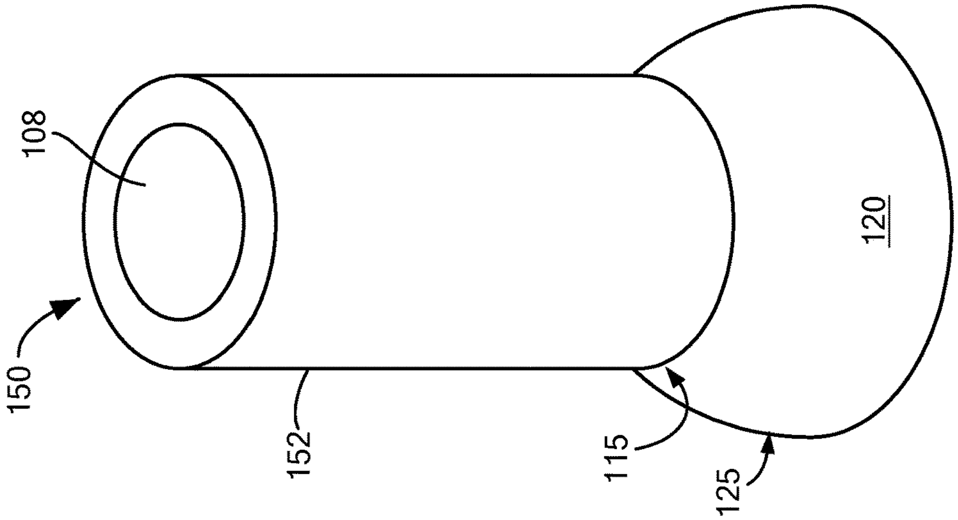

FIGS. 2A-2C show a lower perspective, side elevation and upper perspective views of an atomizer 150 in the environment of FIG. 1. Referring to FIGS. 1 and 2A-2C, the atomizer 150 includes a nozzle 152 and the transducer 120. The nozzle may, for example, be a radial jet reattachment (RJR) or slot jet reattachment (SJR) nozzle. Specifically, the ultrasound vibration will be applied to the liquid feed at the nozzle exit by installing the transducer 120 either on the bottom plate of the nozzle or the bottom plate of the nozzle will be the ultrasound transducer itself. Either way, the bottom plate, shaped at any desired exit angle of the RJR or SJR nozzle, will be the source of ultrasound vibration generating uniform droplets at a desired diameter. The nozzle exit opening size and its exit angle will influence the droplet size. It is important to recognize that the structure of RJR and SJR nozzles will allow for a higher throughput of liquid feed which is generally desirable.

The atomizer 150 generally disposes the transducer 120 adjacent a gap 110 where the drying gas 116 meets the liquid 101 to form an atomization flow 106 in the path 104 defined from the pressurized flow of the gas 116. The liquid 101 forms a film on the transducer 120 in close proximity to the outer edge 114 or opening where the gas 116 passes, liberating droplets 102 in an atomization flow 106 from the transducer oscillations as the transducer sheds droplets of the liquid 101 that meet the gaseous flow 130.

The nozzle thus forms a vessel with an opening defining the atomization exit; and an exit angle defined by a surface of the opening and a surface of the first transducer 120. The nozzle 152 forms the terminus and exit of the liquid vessel 107, and has a bore 108 or channel for delivering the liquid 101 to the gap 110 for communication with the transducer 120. The transducer 120 is of a generally conical shape, having a linear, concave or convex annular surface 125, and engages the exit by insertion of a conical vertex into the exit of the vessel, such that a conical base 124 is disposed downstream of the atomizing flow from the gas. The annular surface 125 of the conical transducer defines an exit angle 126 with the atomization exit 115 defined by the outer edge 114 of the nozzle 152 where the liquid 101 becomes liberated into the gaseous flow. The annular exit of the opening allows a large area for the liquid stream to atomize, based on a diameter of the conical base 124 and the size or diameter of the nozzle 152, as the atomization exit 115 extends circumferentially around an orifice of the nozzle. Other slopes, curves and patterns may define the liquid exit from the nozzle 152. The opening size is defined by an engagement of the transducer with the exit, and a particle size of particles in the atomization flow 106 results from the opening size and an oscillation rate of the transducer, typically an ultrasonic rate. Ambient air may provide the heated drying medium; however, if the liquid includes a flammable solvent such as ethanol or the product is oxygen-sensitive then nitrogen or other inert gas may define the drying gas 116.

The driver circuit 156 includes oscillation logic 157 for driving the transducer 120 at an oscillation rate based on the viscosity, flow rate and intended droplet size. A charge circuit 158 may also be in electrical communication with the liquid for applying an electrical charge to the droplets 102 in the atomized liquid formed by the transducer oscillations. The charge circuit 158 may be part of an electrohydrodynamic (EHD) mechanism for establishing an electrical field upstream or at the exit of the nozzle 152. The instability imposed by the application of electrical field will promote rapid atomization of the liquid film. By electrically charging the liquid feed 107, and thus the droplets 102, the droplets will repel each other and will avoid coalescence.

Figure 3B:
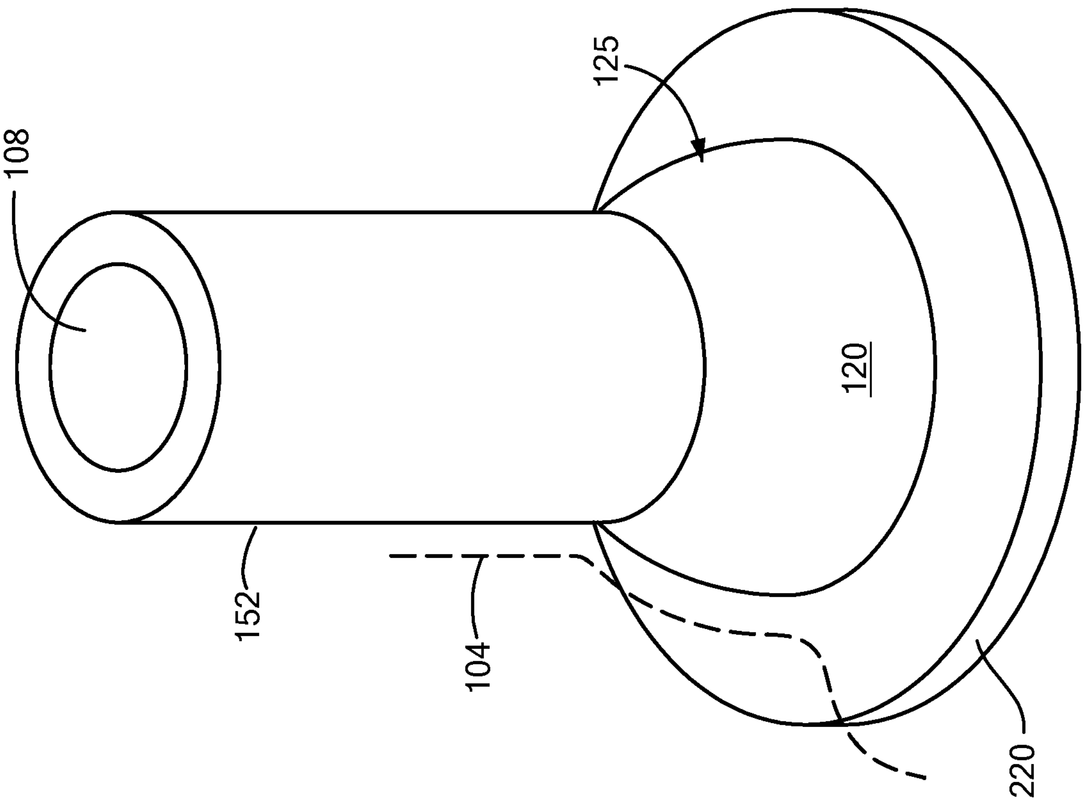
FIGS. 3A-3B show a multi-stage atomizer for use with the configurations of FIGS. 1-2B.
Figure 3A:
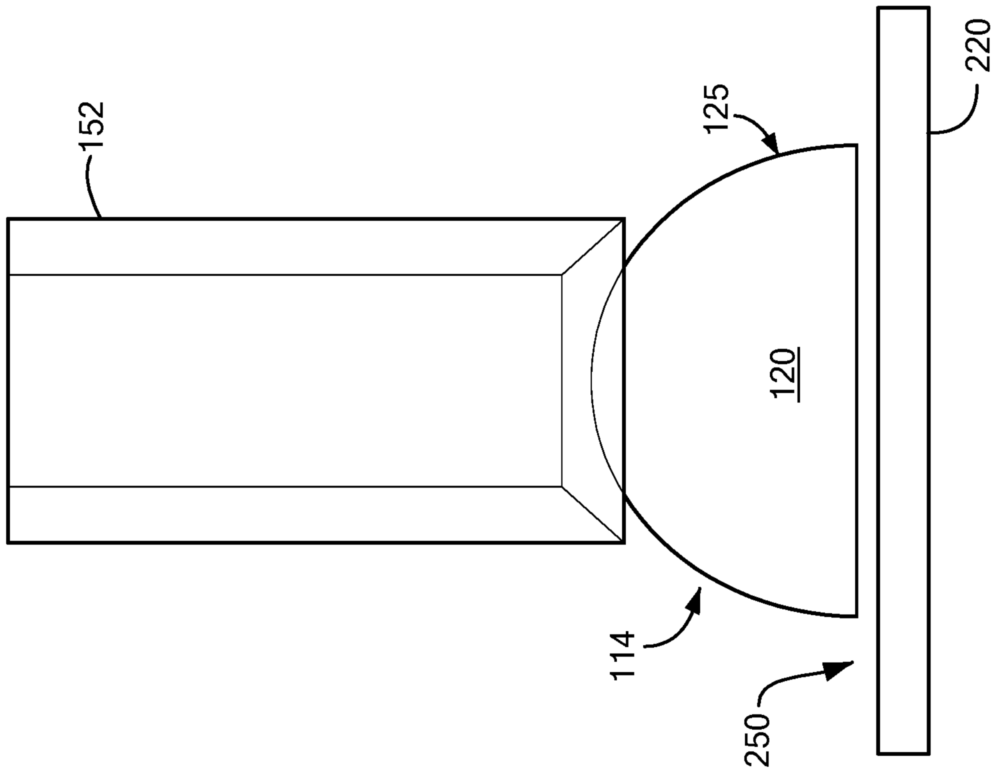

FIGS. 3A-3B show a multi-stage atomizer for use with the configurations of FIGS. 1-2B. Referring to FIGS. 1-3B, a second stage 250 of the atomizer 150 spray dryer is defined by a second transducer 220 disposed in alignment with the first transducer 120 for engaging the atomized liquid in the atomization flow 106 emerging from the exit 115. The second transducer 220 is generally disposed based on the exit angle 126 or position of the first transducer 120 so as to intercept the stream of atomized liquid droplets. The atomization flow 106 thus follows a path 104 where the droplets generated via the first transducer 120 fall onto the second transducer 220 for further refinement.

Further configurations include a plurality of stages, such that each stage is defined by a transducer disposed in a path of an atomizing flow from the liquid feed. The plurality of stages defines a sequence of transducers, in which each stage receives the atomizing flow from the previous transducer in the sequence. In an example configuration, the second transducer is circular and adjacent to a circumference of the conical base. Depending on the process requirements, drop sizes from 10 to 500 μm can be achieved with the appropriate choices. The most common applications are in the 100 to 200 μm diameter range.

FIGS. 4A-4D show transducers location and assembly in the multi-stage atomizer of FIGS. 3A-3B. Referring to FIGS. 1-4D, the first transducer 120 generally has or includes a tapered shape 120' defining the annular or sloped surface 125 forming an exit angle with the atomization exit. The second transducer 220 is adjacent to a circumference of the conical base 124, or to a transducer defining a circumference.

Figure 4B:
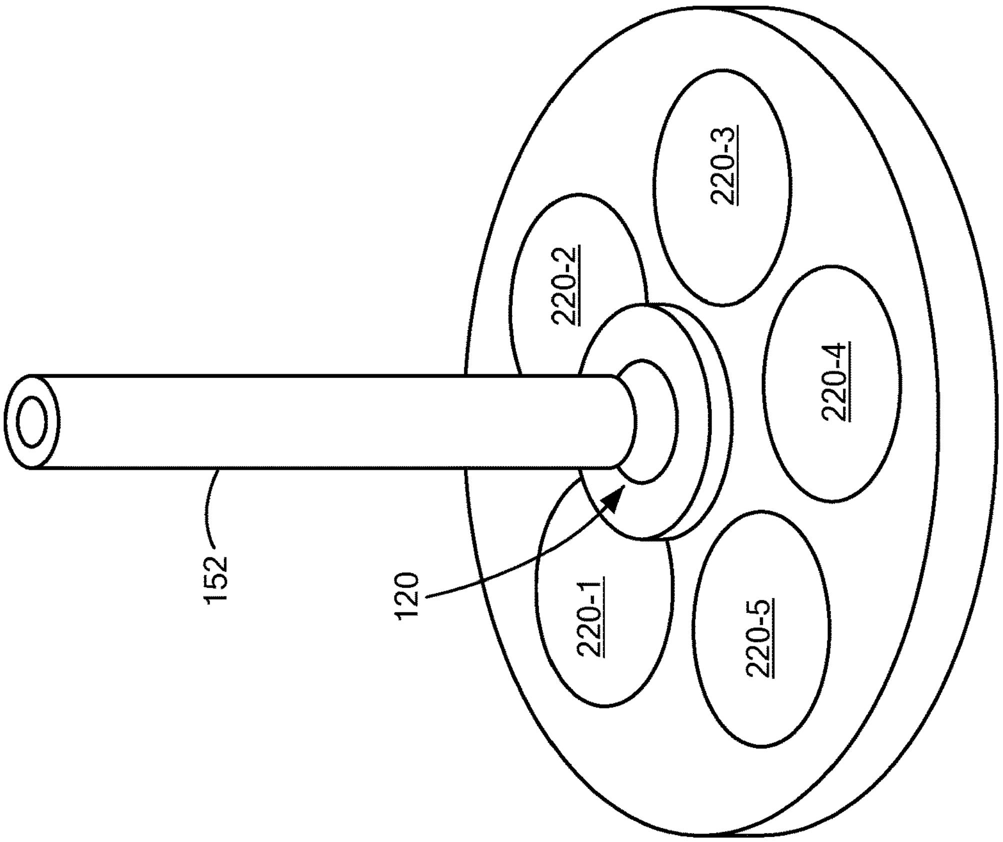
FIGS. 4A-4D show transducers location and assembly in the multi-stage atomizer of FIGS. 3A-3B.
Figure 4A:
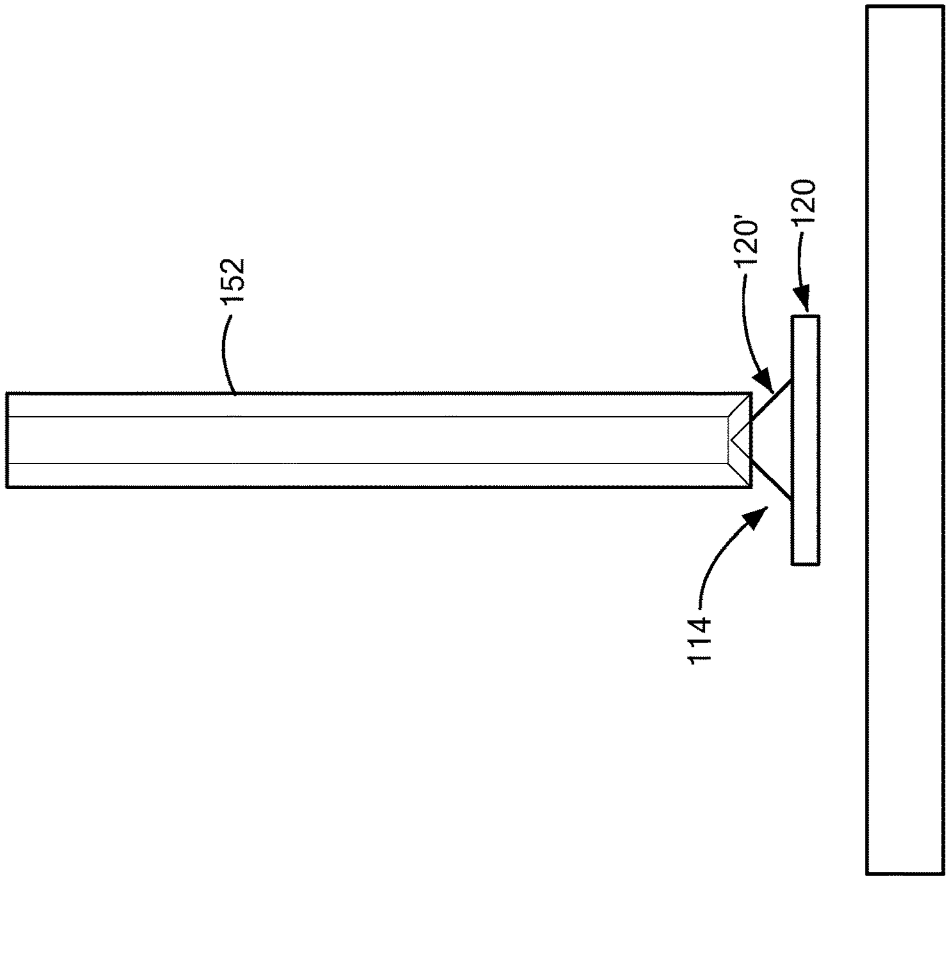
Figure 4C:
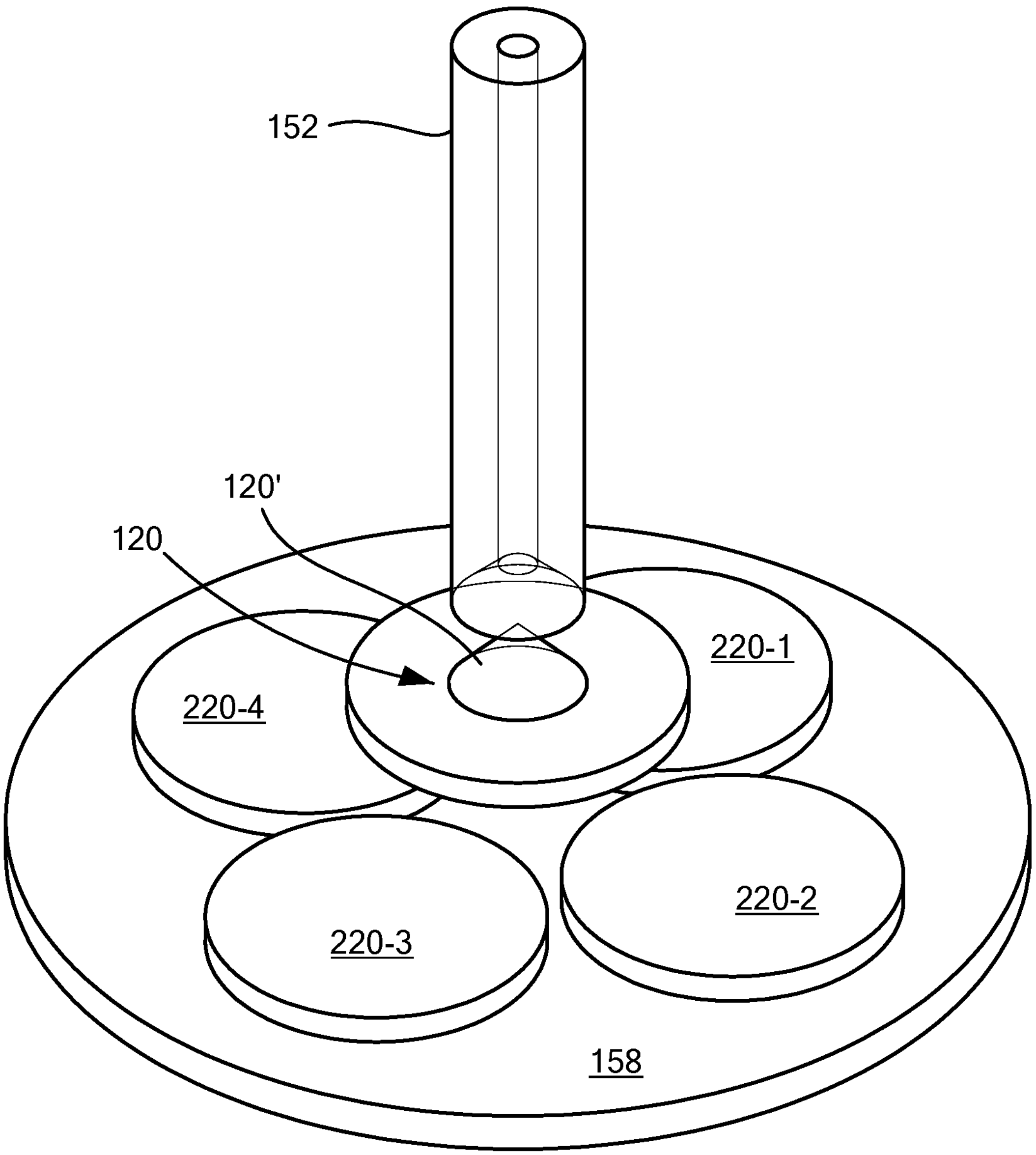
Figure 4D:
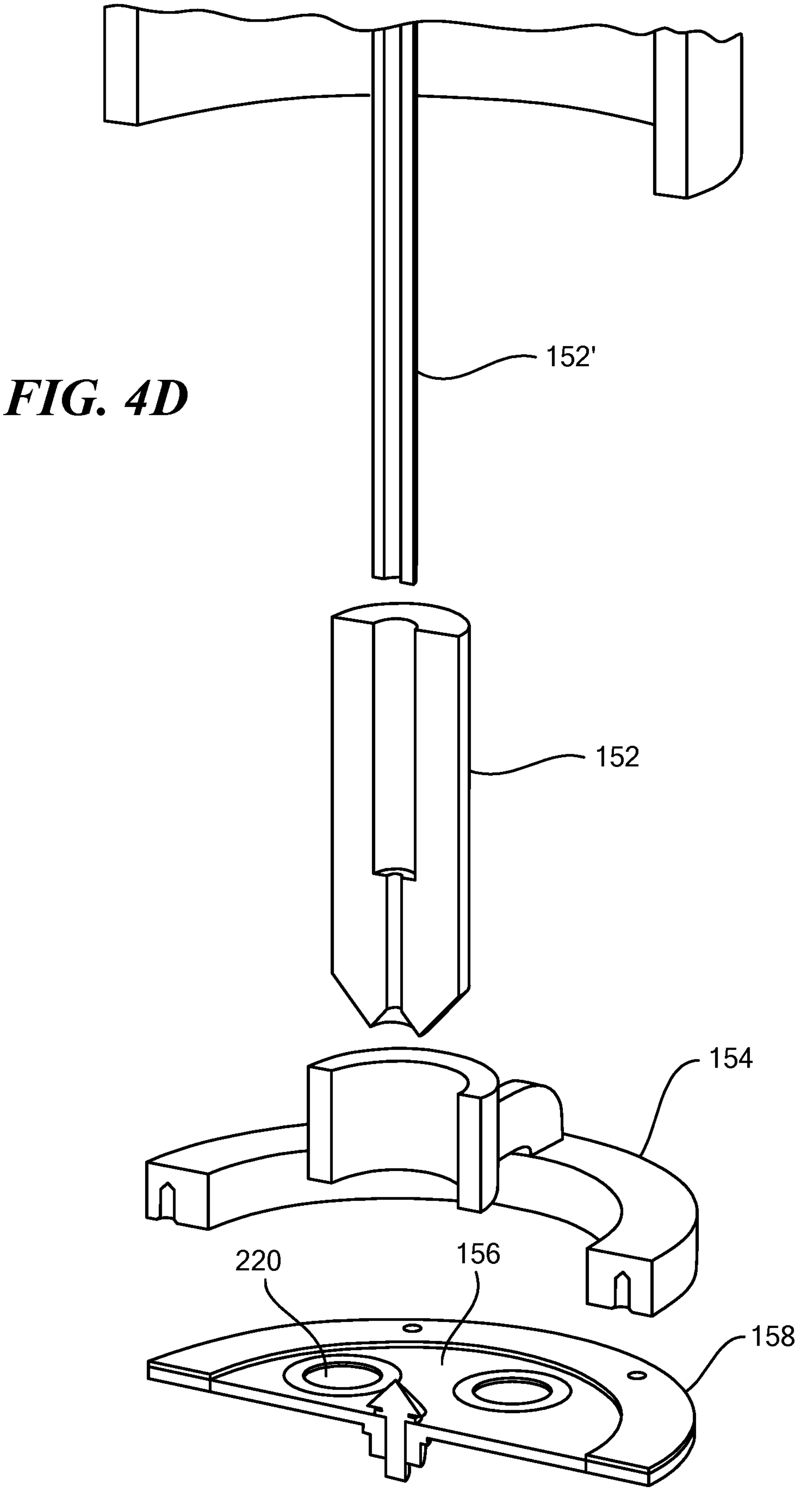

The second stage transducer 220 includes at least one second stage transducer 220 in a serial arrangement with a fluidization stream from the first transducer 120, such that the second stage transducer is disposed in a path 104 based on a deflection surface of the first transducer 120, following the atomization flow 106 emanating from the first transducer 120. In the example of FIGS. 4A-4B, a plurality of second stage transducers 220-1 . . . 220-N (220 generally) form a circumferential arrangement around the first transducer 120. These are shown as individual disk shaped transducers, however other shapes and arrangements may be employed for defining the serial flow among the multiple stages. FIGS. 4C and 4D show the first transducer including a tapered surface 120' defined by a protrusion centered around the atomization exit and forming a unitary transducer 120 structure for the first stage, flanked by second stage transducer 220-N. FIG. 4D shows an exploded view including a circular frame 154 for securing the second stage and a ring 158 for supporting the transducers 220 and associated drive circuits 156.

Figure 5B:
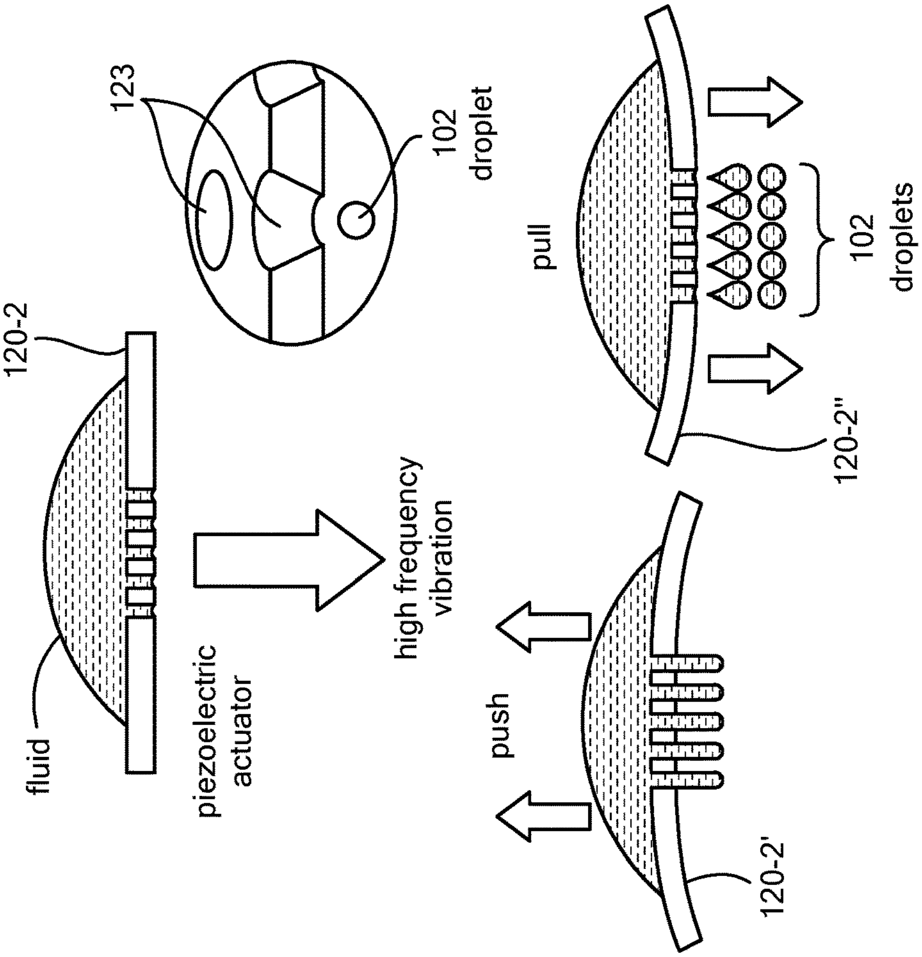
FIG. 5A-5B show transducer atomization for disk and mesh transducers.
Figure 5A:
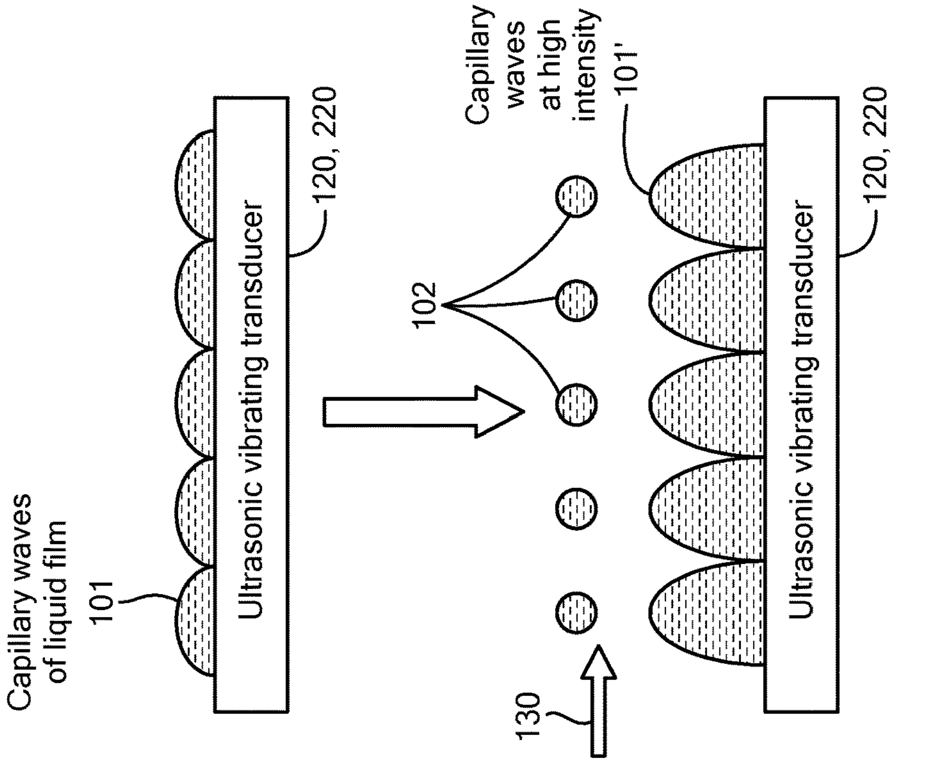

FIG. 5A-5B show transducer atomization for disk and mesh transducers. Ultrasonic atomization is based on the response of the liquid-air interface to incident oscillations, which break the bulk liquid into fine droplets. Vibrating plate transducers (usually in disc shape) are commonly used due to its superior performance. With this type of transducer immersed into a reservoir of water at a certain depth under the water surface, the alternative current (AC) signal is converted to mechanical vibration towards the water-air interface by creating a mist of water droplets. According to capillary wave theory, the capillary wave is formed at the water-air interface as the sound waves propagate, with the sufficient acoustic intensity, the instability of the surface wave would undergo rupture to form fine mist, as depicted in FIGS. 5A-5B. The droplet size is in proportional to the excitation wavelength which, can be predicted by Kelvin's equation:

$$\lambda = \left(\frac{8\pi\sigma}{\rho f^2}\right)^{\frac{1}{3}}$$

Where λ, σ, ρ, and $f$ represent the wavelength, surface tension, fluid density and the excitation frequency, respectively. According to experimental data, it has been determined a correction factor of 0.34 predicts droplet size by wavelength; later studies suggested that this factor showed good agreement for low atomization rate and low frequency range (10-800 kHz), a factor of 0.96 was proposed by subsequent efforts. Even though cavitation becomes a competing theory for explaining some ultrasound phenomena, the capillary wave theory is still widely accepted for droplet size prediction. It is noted that the electrochemical properties of the liquid, such as viscosity, density, surface tension, as well as the liquid film thickness, also behave a significant impact on the droplet size and atomization rate, Referring to FIGS. 1-5B, the edge 114 of the nozzle 152 defines the atomization exit 115 for droplet formation. The transducer 120 oscillation causes the liquid 101 on the transducer, typically forming a film, to achieve an intensity or agitation to form the droplets 102, which are then carried to successive stages or along the path 104 to the collector 128. An alternative approach includes a mesh transducer 120-2 of FIG. 5B, including a perforated, stranded or other surface with orifices 123 for droplet 102 passage. The drive circuit 156 generates oscillations in a convex 120-2' to concave 120-2" flexure for passing the droplets 102. Orifice 123 size further affects the droplet size. In the approach of FIGS. 5A and 5B, the second transducer 220 is positioned for receiving a fluid stream subsequent to contact with the first transducer 120, such that second transducer has a mesh 120-2 or surface for agitating the fluid stream to form atomized droplets 102.

Figure 6:
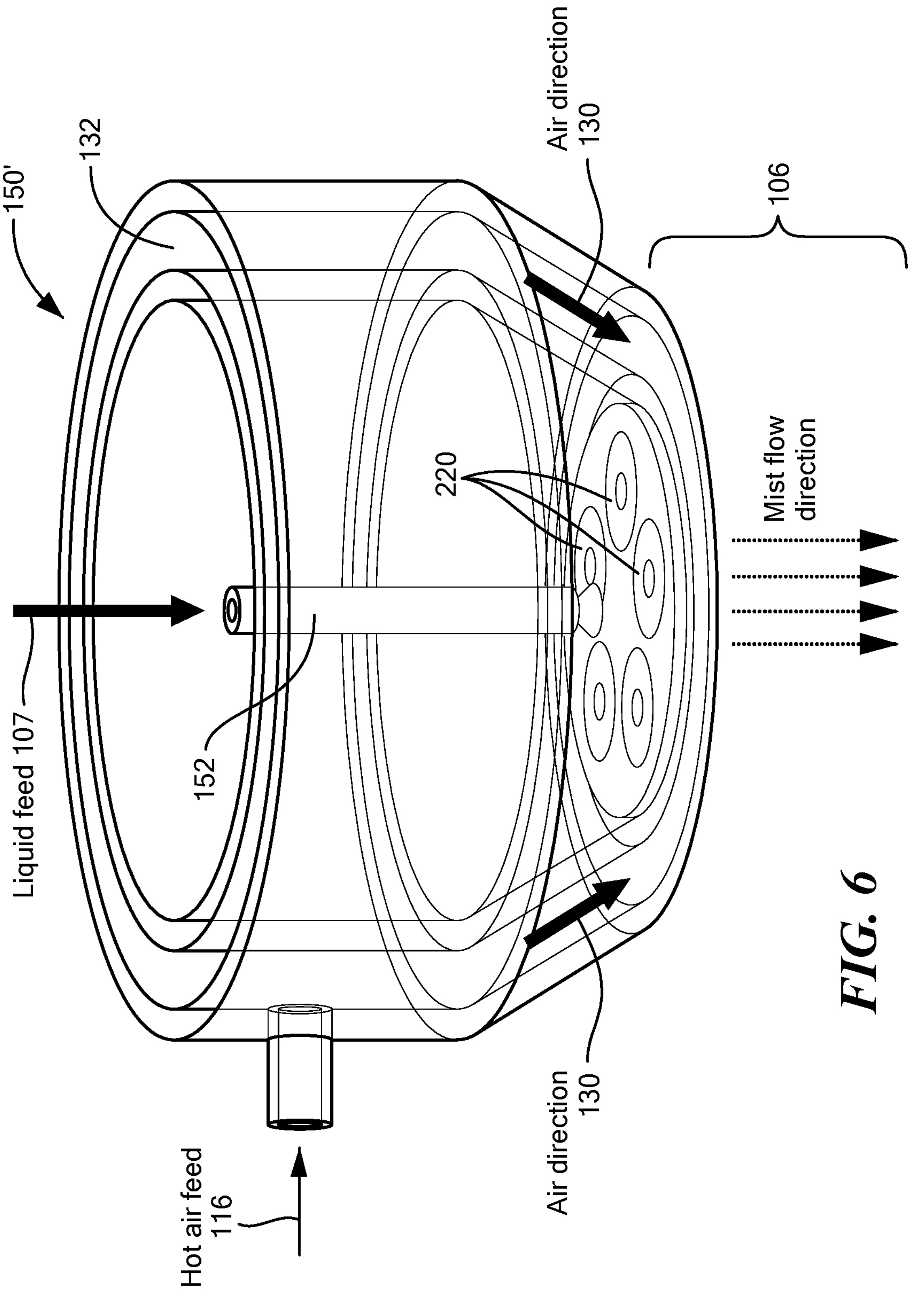
FIG. 6 shows an alternate configuration of an atomizer as in FIG. 1.

FIG. 6 shows an alternate configuration of an atomizer as in FIG. 1. Referring to FIGS. 1 and 6, an atomizer 150' includes a circumferential channel 132 for receiving the drying gas 116 to define the gaseous floe 130. The liquid feed 107 passes through the nozzle 152 in the center, and liquid emerges at the second stage ring 158 to form the atomization flow 106.

Figure 7:
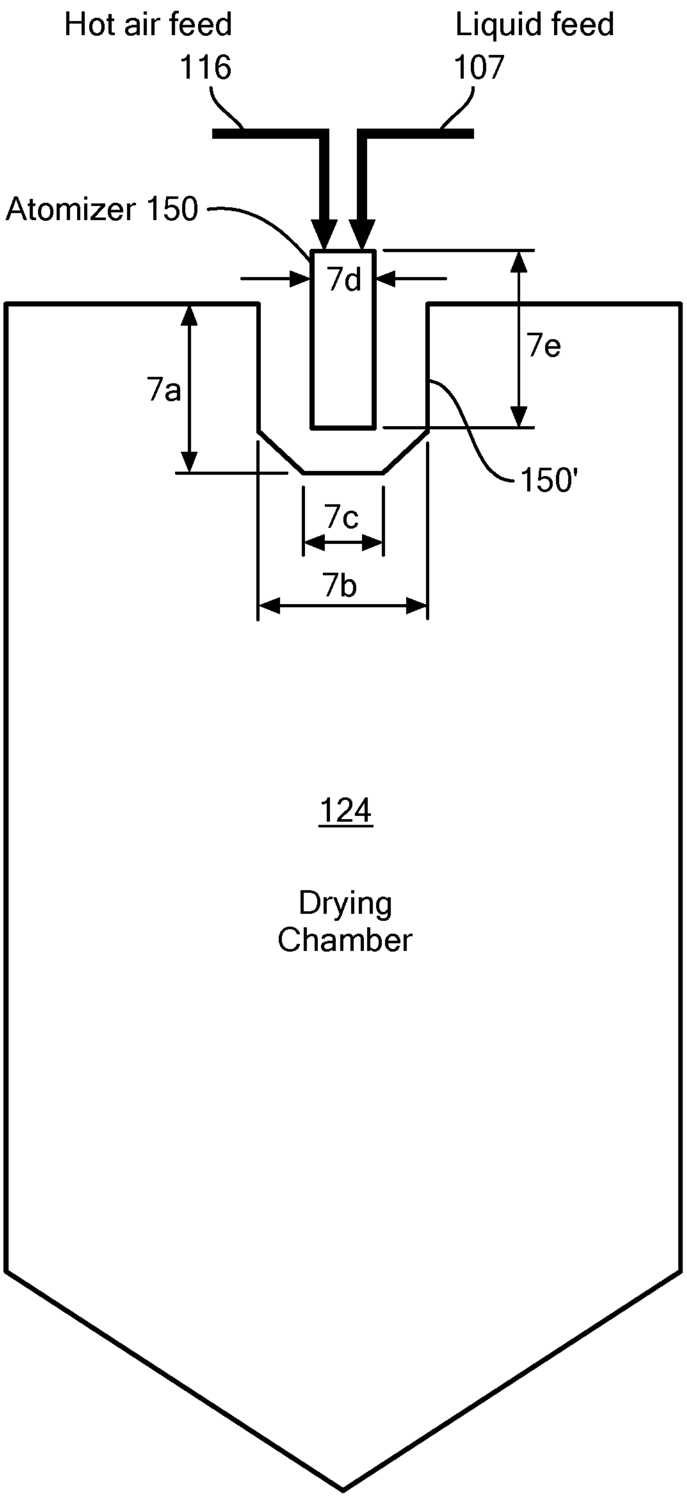
FIG. 7 shows the atomizer of FIG. 6 in a drying chamber.

FIG. 7 shows an example configuration with dimensions of the atomizer 150' of FIG. 6 and drying chamber 124. The dimensions given are illustrative, and serve merely as an example of a particular configuration. Other sizes and dimensions may also be employed. The atomizer 150 extends a length 7*a* of 12.5 inches into the drying chamber 124. The transducer nozzle has a height 7*e* of about 18 inches and a width 7*d* of 4 inches, and supplies the atomizer 150' having outside dimensions 7*c* of 9 inches wide fanning inwards to an outlet diameter 7*b* of 6.5 inches.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. An atomizing device for use in an atomizing spray dryer comprising:
- a liquid feed vessel having a liquid source providing a liquid, and an atomization exit;
- a first transducer in proximity and downstream of the atomization exit, the first transducer disposed to define a gap between an outer edge of the liquid feed vessel and the first transducer;
- a second stage, the second stage defined by a second transducer disposed in alignment with the first transducer for engaging an atomized liquid emerging from the atomization exit; and
- a driver circuit connected to the first transducer and configured for driving the first transducer at an oscillation rate, the liquid from the liquid feed vessel flowing between the gap in communication with the first transducer for generating an atomization flow defined by formed by droplets of the atomized liquid.

2. The device of claim 1 further comprising a plurality of stages, each stage defined by a respective transducer disposed in a path of an atomizing flow from the liquid from the liquid feed vessel, each transducer in the plurality of stages defining a sequence of transducers including at least the first transducer and the second transducer, each stage receiving the atomizing flow from a previous transducer in the sequence.

3. The device of claim 1 wherein the gap has an opening size defined by an engagement of the first transducer with the atomization exit, and the atomization flow includes droplets having a size defined by the opening size and an oscillation rate of the first transducer.

4. The device of claim 3 wherein the first transducer has a tapered shape forming a conical vertex and engages the atomization exit by insertion of the conical vertex into the atomization exit of the liquid feed vessel, and a conical base disposed downstream of the atomization flow across the first transducer.

5. The device of claim 4 wherein the conical vertex defines an annular surface forming an exit angle with the atomization exit.

6. The device of claim 4 wherein the second transducer is adjacent to a circumference of the conical base.

7. The device of claim 1 further comprising at least one second transducer in a serial arrangement with a fluidization stream from the first transducer; the second transducer defining a second stage and disposed in a path based on a deflection surface of the first transducer.

8. The device of claim 7 wherein the second stage further comprises a plurality of second transducers in a circumferential arrangement around the first transducer.

9. The device of claim 7 further comprising a nozzle, the nozzle defining the atomization exit; and an exit angle defined by a surface of the opening and a surface of the first transducer.

10. The device of claim 7 wherein the first transducer includes a tapered surface defined by a protrusion centered around the atomization exit.

11. The device of claim 10 wherein the second transducer is positioned for receiving a fluid stream subsequent to contact with the first transducer, the second transducer having a mesh or surface for agitating the fluid stream to form atomized droplets.

12. The device of claim 1 further comprising a drying gas source imposing a gaseous flow adjacent the transducer, the gaseous flow receiving the atomized liquid for transporting the droplets for forming an atomization flow of propelled particles during drying of the particles into a dry powder.

13. The device of claim 1 further comprising a charge circuit, the charge circuit in electrical communication with the liquid for applying an electrical charge to droplets in the atomized liquid formed by oscillations of the transducer.

14. The device of claim 9 wherein the nozzle is one of a radial jet reattachment (RJR) nozzle or a slot jet reattachment (SJR) nozzle, and the second transducer is disposed in a position based on the exit angle.

* * * * *